US010001891B2

(12) United States Patent
Ikeda et al.

(10) Patent No.: US 10,001,891 B2
(45) Date of Patent: Jun. 19, 2018

(54) CONDUCTIVE FILM AND TOUCH PANEL INCLUDING THE SAME

(71) Applicant: SMK Corporation, Tokyo (JP)

(72) Inventors: Ryuji Ikeda, Kanagawa (JP);
Masayuki Nagumo, Kanagawa (JP);
Ryo Okamura, Kanagawa (JP);
Kensaku Mizumoto, Kanagawa (JP)

(73) Assignee: SMK Corporation, Tokyo (JP)

( * ) Notice: Subject to any disclaimer, the term of this patent is extended or adjusted under 35 U.S.C. 154(b) by 75 days.

(21) Appl. No.: 15/260,328

(22) Filed: Sep. 9, 2016

(65) Prior Publication Data

US 2017/0277298 A1    Sep. 28, 2017

(30) Foreign Application Priority Data

Mar. 23, 2016    (JP) .................... 2016-58262

(51) Int. Cl.
| | |
|---|---|
| *G06F 3/044* | (2006.01) |
| *G06F 3/041* | (2006.01) |
| *H04B 5/00* | (2006.01) |
| *B32B 3/10* | (2006.01) |
| *B32B 15/20* | (2006.01) |

(Continued)

(52) U.S. Cl.
CPC ............... *G06F 3/044* (2013.01); *B32B 3/10* (2013.01); *B32B 15/20* (2013.01); *G06F 3/046* (2013.01); *H04B 5/0075* (2013.01); *B32B 2307/202* (2013.01); *B32B 2457/208* (2013.01); *G06F 2203/04101* (2013.01); *G06K 19/07758* (2013.01); *G06K 19/07783* (2013.01)

(58) Field of Classification Search
CPC .............................. G06F 3/044; H04B 5/0075
See application file for complete search history.

(56) References Cited

U.S. PATENT DOCUMENTS

| | | | |
|---|---|---|---|
| 2012/0299863 A1 | 11/2012 | Yilmaz | |
| 2014/0320352 A1* | 10/2014 | Hsu .......................... H01Q 1/36 |
| | | | 343/702 |

FOREIGN PATENT DOCUMENTS

| | | | |
|---|---|---|---|
| JP | 3160091 U | * | 6/2010 |
| JP | 5321151 B2 | | 7/2013 |

OTHER PUBLICATIONS

Ortego et al., "Inkjet Printed Planar Coil Antenna Analysis of NFC Technology Applications", International Journal of Antennas and Propagation, vol. 2012, Jan. 1, 2012 (Jan. 1, 2012), p. 1-6, XP 055394557.*

(Continued)

*Primary Examiner* — Xuemei Zheng (57) ABSTRACT

An object of the present disclosure is to improve visibility while suppressing an impedance of an antenna pattern formed on a conductive film. In a film base material on which an antenna pattern for near field communication is formed, the antenna pattern is formed of a metal having excellent conductivity. The antenna pattern is formed into a loop line shape with three to five turns and has a length of 200 to 500 mm, an interval between adjacent loop lines of 200 to 400 μm, and a line width of 4 to 20 μm. The thickness of the antenna pattern is set to a value calculated by the following Formula (1) so that the impedance at a maximum load becomes equal to or less than 50Ω.

Thickness=Specific Resistance×Length/(Impedance× Width)    Formula (1)

4 Claims, 9 Drawing Sheets

(51) Int. Cl.
*G06F 3/046* (2006.01)
*G06K 19/077* (2006.01)

(56) References Cited

OTHER PUBLICATIONS

I. Ortego et al: "Inkjet Printed Planar Coil Antenna Analysis for NFC Technology Applications", International Journal of Antennas and Propagation, vol. 2012, Jan. 1, 2012, pp. 1-6, XP055394557, ISSN:1687-5869, DOI:10.1155/2012/486565.
Extended European Search Report for European Patent Application No. 16188461.4, issued by the European Patent Office dated Aug. 9, 2017.

* cited by examiner

CONDUCTIVE FILM AND TOUCH PANEL INCLUDING THE SAME

CROSS REFERENCE TO RELATED APPLICATION

The contents of the following Japanese patent application are incorporated herein by reference,
Japanese Patent Application No. 2016-58262 filed on Mar. 23, 2016.

BACKGROUND

1. Technical Field

The present disclosure relates to a conductive film and a touch panel which are capable of improving visibility.

2. Related Art

As recent touch panels, capacitive touch panels have become mainstream. Transparent touch panels which have a mesh-like pattern formed thereon using copper or silver as a low resistive element to obtain the same sensitivity as that of a small touch panel (with a size of 5 to 8 inches) and which have excellent sensitivity and permeability have been mass-produced as large touch panels with a size of 10 to 15 inches.

A touch panel having a two-layered structure in which a pattern for a sensor is formed on the front surface of a base material and a pattern for driving is formed on the back surface of the base material is commonly known. A one-layer type pattern obtained by forming drive and sensor patterns on one surface of a base material has also been devised. With this pattern, the production process of a sensor can be simplified and the sensor can be produced at low cost.

The use of a coordinate detection IC corresponding to such a pattern makes it possible to provide a low-cost touch sensor which has a configuration in which an antenna pattern can be disposed on an opposite side of a one-layer type electrostatic touch panel and which has a touch sensor function as well as an antenna function. Additionally, by incorporating the antenna pattern into the touch panel, the space for a near field communication antenna reading unit and a Bluetooth antenna unit, which are conventionally provided as external units, can be saved, and thus a smaller device can be provided.

A conductive film having a configuration in which an antenna pattern is formed on a plastic film, such as a polyester film, is known as a conductive film used for a touch panel or the like.

There is a demand from customers to suppress the impedance of the antenna pattern in such a conductive film. For example, Japanese Patent No. 5321151 discloses a conductive film in which the width, thickness, and the like of a conductive mesh are specified and an excellent surface resistance value and an excellent transmittivity can be obtained even when the thickness is small.

However, the conductive film disclosed in Japanese Patent No. 5321151 is not intended to obtain excellent visibility, and it is not clear that the visibility is excellent.

In order to reduce the impedance of the antenna pattern, for example, it is possible to employ a method of increasing a pattern sectional area by increasing a pattern width. However, an increase in pattern width causes a problem that the visibility of the touch panel deteriorates. When the pattern width is increased, the antenna pattern can be observed with the naked eyes, which leads to a deterioration in the visibility with respect to an image display or the like on a display.

SUMMARY

The present disclosure has been made to solve the above-mentioned problem, and it is an objective of the present disclosure to provide a conductive film capable of improving visibility while suppressing the impedance of the antenna pattern formed on the conductive film, and a touch panel including the conductive film.

In order to achieve the above-mentioned object, a conductive film according to a first aspect of the invention includes: a film base material; and an antenna pattern for near field communication formed of a metal having excellent conductivity on one surface of the film base material, both ends of the antenna pattern being located at an edge of the film base material, the antenna pattern being formed as a plurality of linear loops surrounding a vacant area so that the vacant area is located at a center of the antenna pattern. The antenna pattern has a length of 200 to 500 mm, an interval between adjacent loop lines of 200 to 400 μm, and a line width of 4 to 20 μm, and a thickness of the antenna pattern is set to a value calculated by the following Formula (1) so that an impedance at a maximum load becomes equal to or less than 50Ω.

$$\text{Thickness} = \text{Specific Resistance} \times \text{Length}/(\text{Impedance} \times \text{Line Width}) \quad \text{Formula (1)}$$

According to this configuration, the antenna pattern is formed of a metal having excellent conductivity, and the thickness of the antenna pattern is set so that the impedance becomes equal to or less than 50Ω. Further, the antenna pattern is formed into a loop line with three to five turns and has a length of 200 to 500 mm, an interval between adjacent loop lines of 200 to 400 μm, and a line width of 4 to 20 μm. Accordingly, the visibility can be improved while the impedance of the antenna pattern formed on the film base material is suppressed.

In the conductive film having the configuration described above, the film base material may be formed into a size corresponding to a size of the antenna pattern, and a plurality of conductive films each having a configuration in which the antenna pattern is formed on the film base material are stacked in such a manner that the antenna patterns match each other. In addition, a total thickness obtained when the number of stacked conductive films is multiplied by the thickness of the antenna pattern may be set to a value at which the impedance at the maximum load according to the first aspect of the invention is equal to or less than 50Ω.

With this configuration, the degree of freedom in setting the thickness of the antenna pattern of each film base material can be improved.

In the conductive film having the configuration described above, each loop line of the antenna pattern may be formed into one of a square, a triangle, and a circle. With this configuration, an antenna pattern that matches the shape of a tag can be selected.

In a touch panel according to another aspect of the invention, an electrode pattern for detecting a touch position in an X-direction and a touch position in a Y-direction is formed on the other surface of the conductive film, and a cover panel is superimposed on the other surface of the conductive film. With this configuration, the conductive film can be formed into a film with a simple structure and the production process thereof can be simplified, which leads to a reduction in production cost.

In a touch panel according to a second aspect of the invention, the conductive film described above includes another conductive film; a pair of electrode patterns for detecting a touch position in an X-direction and a touch position in a Y-direction are formed in a divided manner on both sides of the other conductive film; the other conductive film is superimposed on a surface of the conductive film opposite to a surface on which the antenna pattern is formed; and a cover panel is further superimposed on the other conductive film.

With this configuration, a pair of electrode patterns can be formed in a divided manner on both sides of the conductive film, so that each electrode pattern can be formed with a simple configuration as compared with a case where the electrode patterns are formed on one surface of the conductive film.

According to the aspects of the invention, it is possible to improve the visibility of a conductive film and a touch panel while suppressing the impedance of an antenna pattern formed on the conductive film.

DETAILED DESCRIPTION

A touch panel according to an embodiment of the present disclosure will be described below with reference to FIGS. 1A to 7.

Figure 1A:
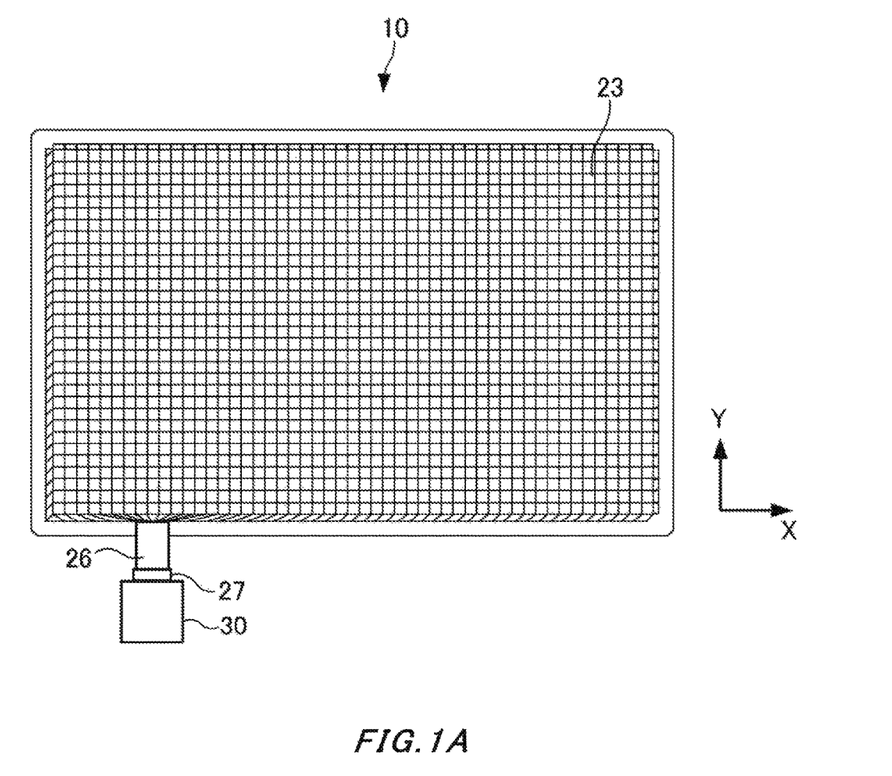
FIG. 1A is a schematic front elevation of a touch panel according to an embodiment of the present disclosure.
Figure 1B:
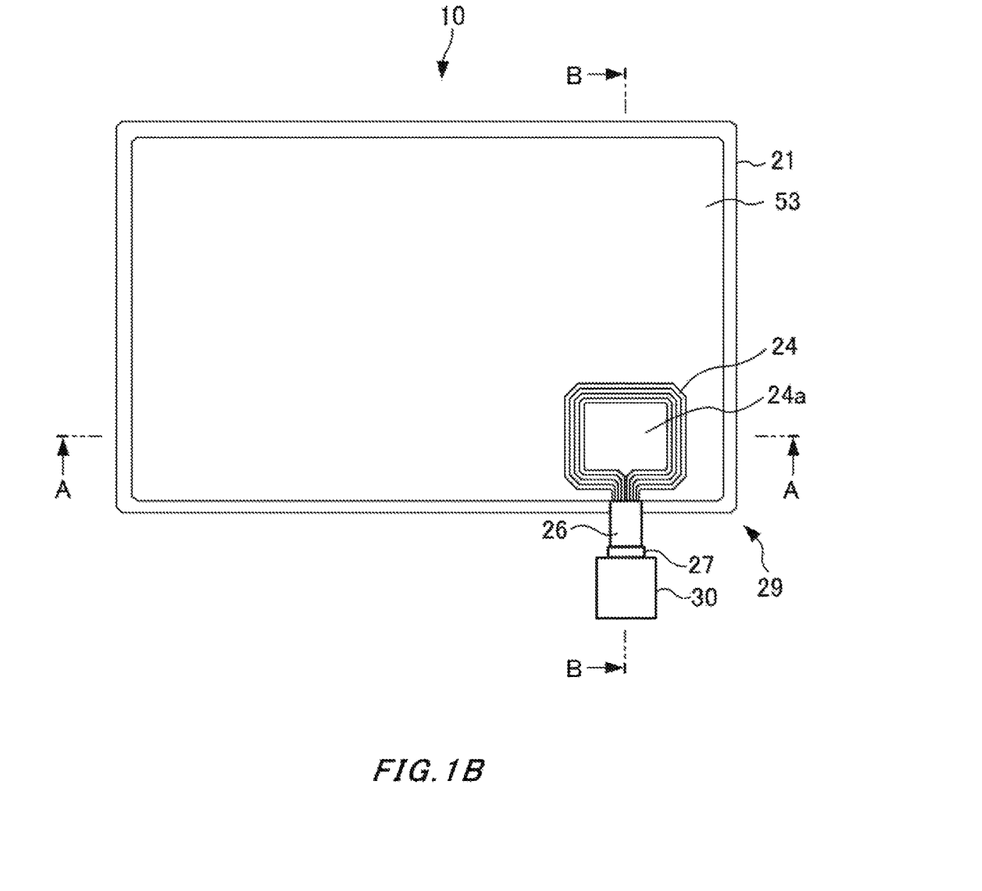
FIG. 1B is a schematic rear elevation of the touch panel according to the embodiment of the present disclosure.

FIG. 1A is a schematic front elevation of a touch panel 10 according to a first embodiment, and FIG. 1B is a schematic rear elevation thereof. As shown in FIG. 1B, the touch panel 10 according to the first embodiment includes a film base material 21, a cover panel 22, an antenna pattern 24 which is formed on one surface of the film base material 21, and a number-of-turns setting circuit 30 which is connected to the antenna pattern 24 via a flexible printed wiring board 26. The conductive film 11 is composed of the film base material 21 and the antenna pattern 24. The antenna pattern 24 is disposed in a touch operation effective range 53 of the conductive film 11. As shown in FIG. 1A, an electrode pattern 23 for detecting in a capacitive manner a position of a finger in a touch operation is provided on the other surface of the film base material 21.

The touch panel 10 is configured to transmit and receive information in a non-contact manner by near field communication with a communication counterpart using, for example, an RFID, through a loop antenna 29 which is composed of the antenna pattern 24 and the number-of-turns setting circuit 30. The communication counterpart is, for example, a cellular phone incorporating an IC card for transportation, an IC card for electronic funds transfer, or an IC chip for data communication.

Figure 2:
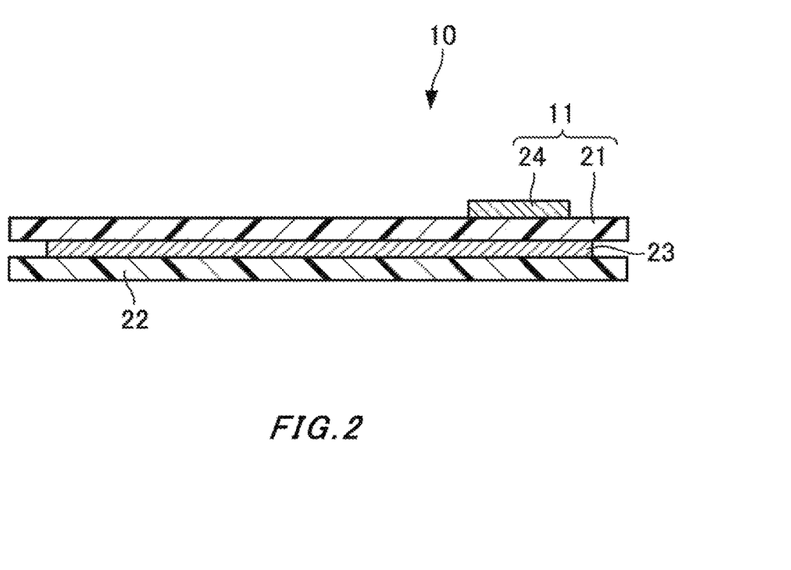
FIG. 2 is a sectional view of the touch panel according to the embodiment of the present disclosure taken along a line A-A in FIG. 1B.

FIG. 2 is a sectional view taken along a line A-A in FIG. 1B. As shown in FIG. 2, the antenna pattern 24 is formed on the lower surface of the film base material 21; the electronic pattern 23 is formed on the upper surface of the film base material 21; and the cover panel 22 is attached to the electrode pattern 23. The entire structure is referred to as a sensor panel 20. On the upper surface of the film base material 21, not only the electrode pattern 23, but also a direction detection sensor pattern and a Bluetooth antenna pattern may be provided to detect the input direction in the air.

Figure 3:
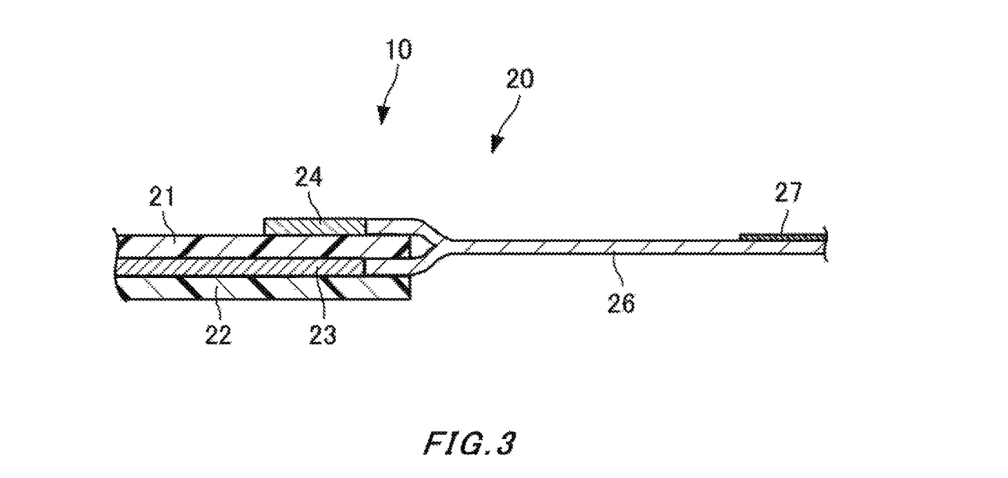
FIG. 3 is a sectional view of the touch panel according to the embodiment of the present disclosure taken along a line B-B in FIG. 1B.

As shown in FIG. 1B, the number-of-turns setting circuit 30 is connected to an end of the antenna pattern 24, which forms the loop antenna 29, via the flexible printed wiring board (FPC) 26 and an FPC connector 27. FIG. 3 is a sectional view taken along a line B-B in FIG. 1B. As shown in FIG. 3, the electrode pattern 23 is also connected to a control unit 40 (see FIG. 4) via the same flexible printed wiring board 26. The electrode pattern 23 may be connected to the control unit 40 via a flexible printed wiring board different from the flexible printed wiring board 26.

The number-of-turns setting circuit 30 is connected to the antenna pattern 24, and is configured to set the number of turns of the loop antenna 29 so that the loop antenna 29 functions as a loop antenna having a desired number of turns. Specifically, the number-of-turns setting circuit 30 includes a plurality of lines and jumper switches, and selectively connects to loop lines 25a to 25e, thereby obtaining a desired number of turns in a range from one to five turns.

The film base material 21 is, for example, a rectangular, thin-film-like base material made of polyethylene terephthalate (PET). The cover panel 22 is a thin-film-like member made of glass, polycarbonate (PC), or acrylic resin (PMMA).

The electrode pattern 23 is formed on the film base material 21 by using copper or silver, which has a small electric resistance, as a material, and using techniques, such as etching, vapor deposition, screen printing, and photolithography, singly or in combination. The line width of the pattern is set to, for example, about several μm to several tens of μm, to prevent the display of a display unit, such as a liquid crystal screen, from being inhibited, thereby making it difficult to visually observe the pattern itself and making it easy to view the display of the display unit.

The electrode pattern 23 includes an electrode pattern for detecting a touch position in an X-axis direction in the touch operation on the sensor panel 20, an electrode pattern for detecting a touch position in a Y-axis direction, and a wiring pattern for extracting signals from the electrode patterns.

The detection of a position in the touch operation by the electrode pattern 23 utilizes a phenomenon that when a finger is moved closer to the front surface of the sensor panel 20, the electrostatic capacity of an electrode at a location close to the finger changes. A change in the electrostatic capacity is detected in each of the X-axis direction and the Y-axis direction, and the XY coordinates of the finger, i.e., the position of the finger within the sensor panel 20, is specified.

Figure 4:
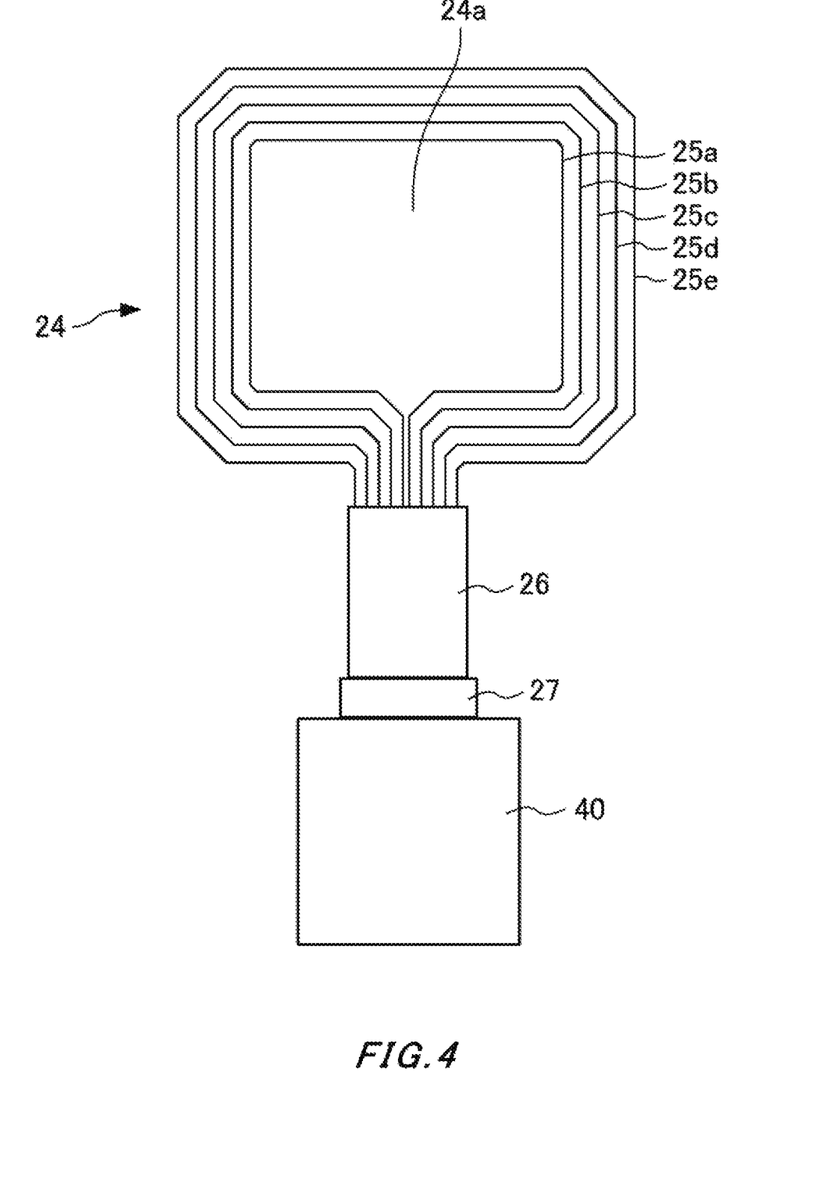
FIG. 4 is a schematic configuration diagram showing an antenna pattern and a number-of-turns setting circuit according to the embodiment of the present disclosure.

Both ends 24b and 24c of the antenna pattern 24 are located at an edge of the film base material 21 and the antenna pattern 24 is formed as a plurality of loop lines surrounding a vacant area 24a in such a manner that the vacant area 24a is located at the center of the antenna pattern 24. Specifically, the antenna pattern 24 has a configuration in which, as shown in FIG. 4, loop lines 25a, 25b, 25c, 25d, and 25e, which are a number of linear conductors corresponding to a maximum number of turns, are arranged at predetermined intervals around the vacant area 24a having a rectangular shape (as described later). In this embodiment, the maximum number of turns of the antenna pattern 24 is five. Accordingly, the antenna pattern 24 includes five loop lines 25a to 25e as linear conductors. For example, the maximum number of turns may be, for example, three, four, or six.

The antenna pattern 24 is formed on one surface of the film base material 21 by using copper or silver, which has a small electric resistance and excellent conductivity, as a material, and using techniques, such as etching, vapor deposition, screen printing, and photolithography, singly or in combination. From the viewpoint of facilitating the production, it is preferable to form the antenna pattern 24 in the same manner as the electrode pattern 23. The line width of the pattern is set to about 4 µm to 20 µm to prevent the display of the display unit, such as a liquid crystal screen, from being inhibited, thereby making it difficult to visually observe the pattern itself. Instead of directly forming the antenna pattern 24 on the film base material 21 by the above-described method, a pattern formed on another film base material may be attached to the film base material 21.

Figure 5A:
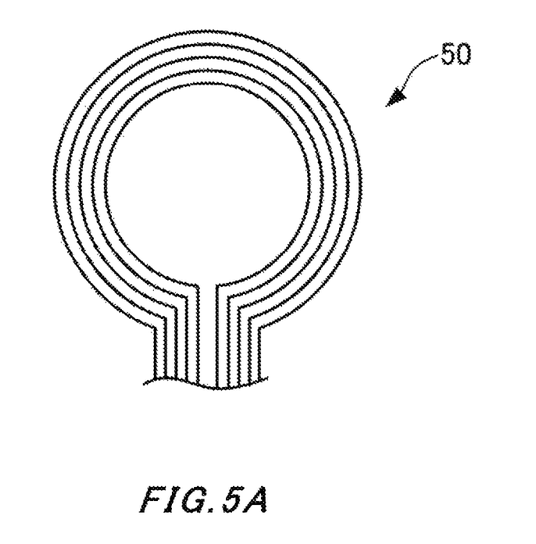
FIG. 5A is an explanatory diagram showing a modified example of the antenna pattern according to the embodiment of the present disclosure.
Figure 5B:
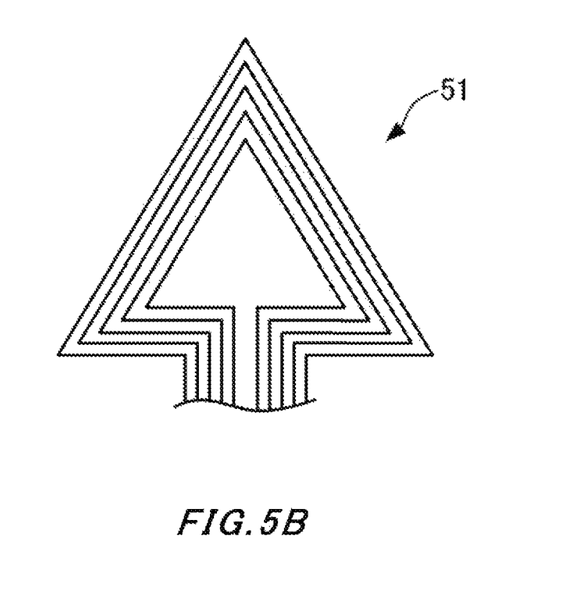
FIG. 5B is an explanatory diagram showing a modified example of the antenna pattern according to the embodiment of the present disclosure.
Figure 5C:
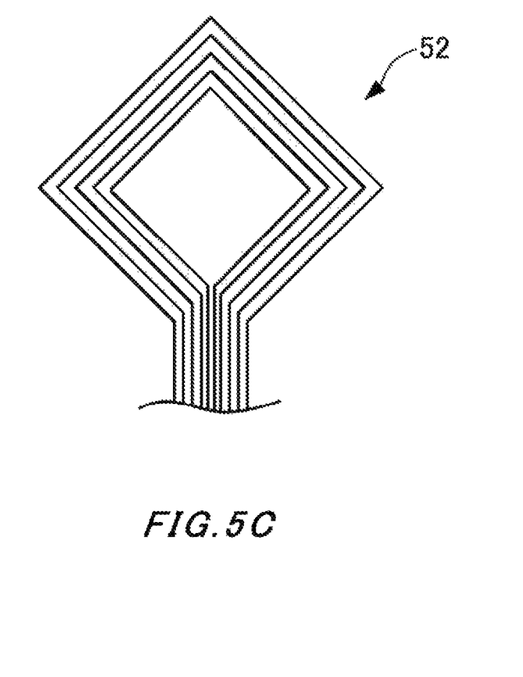
FIG. 5C is an explanatory diagram showing a modified example of the antenna pattern according to the embodiment of the present disclosure.

In this embodiment, the vacant area 24a of the antenna pattern 24 has a rectangular shape, but the shape of the vacant area 24a is not limited to this. As shown in FIGS. 5A to 5C, antenna patterns of any shape, such as an antenna pattern 50 including a circular vacant area 50a, an antenna pattern 51 including a triangular vacant area 51a, and an antenna pattern 52 including a rhombic vacant area 52a, can be adopted depending on the antenna shape or the like of the communication counterpart.

Figure 6:
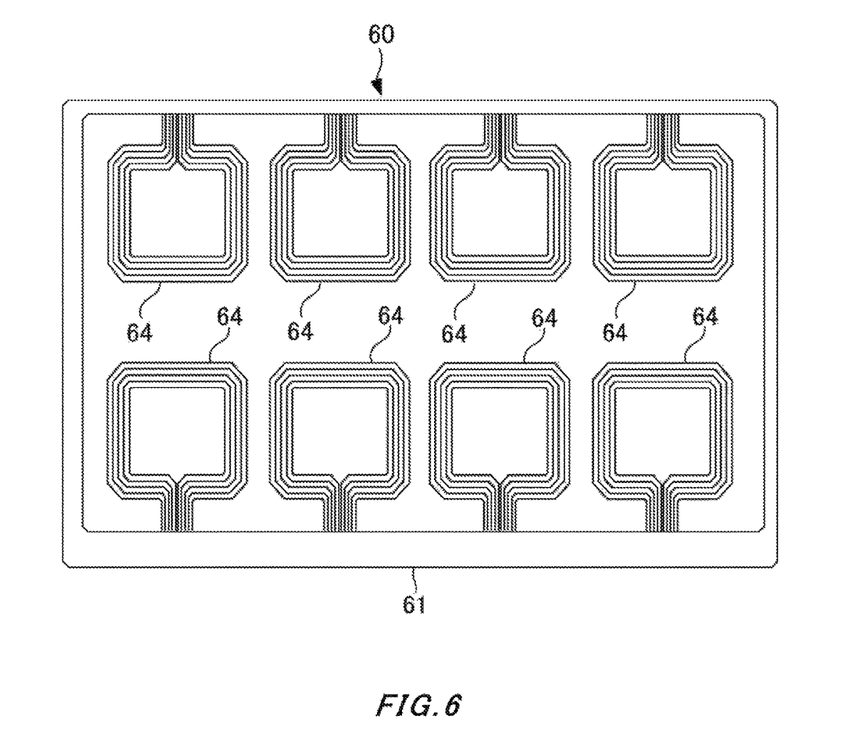
FIG. 6 is a schematic rear elevation showing a modified example of the touch panel according to the embodiment of the present disclosure.

As shown in FIG. 6, a film base material 61 of a touch panel 60 may include a plurality of antenna patterns 64.

Figure 7:
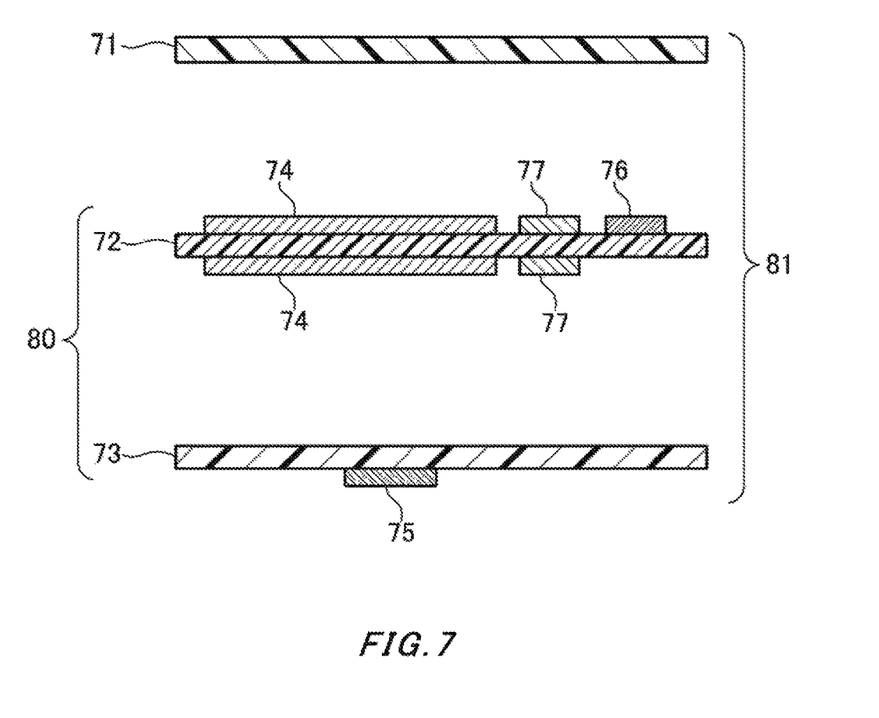
FIG. 7 is an exploded configuration diagram showing a modified example of the touch panel according to the embodiment of the present disclosure.

As shown in FIG. 7, a conductive film 80 may have a configuration in which two film base materials, i.e., a film base material 72 and a film base material 73, are stacked. A pair of electrode patterns 74 for detecting a position in the touch operation is formed in a divided manner on both sides of the film base material 72. Further, the film base material 72 is provided with a direction detection sensor pattern 77 and a Bluetooth antenna pattern 76 for detecting an input in the air. An antenna pattern 75 for near field communication is formed on a surface of the film base material 73 opposite to a surface in contact with the film base material 72. The film base material 72 and the film base material 73 are, for example, rectangular, thin-film-like base materials made of polyethylene terephthalate (PET). A cover panel 71 which is made of glass, polycarbonate (PC), or acrylic resin (PMMA) is stacked on the film base material 72, and the entire structure forms a touch panel 81.

Figure 8:
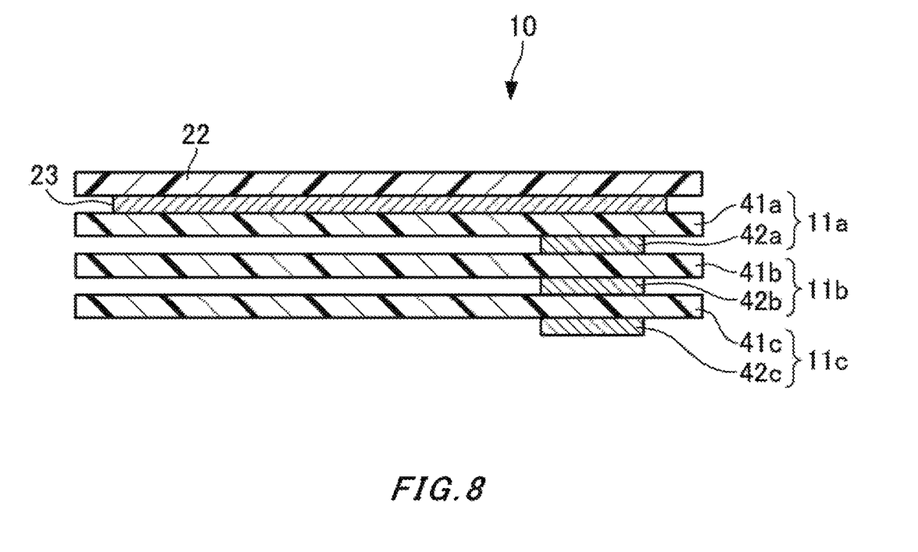
FIG. 8 is an exploded configuration diagram showing a modified example of the touch panel according to the embodiment of the present disclosure.

As a modified example, as shown in FIG. 8, a plurality of conductive films 11a to 11c are stacked in such a manner that film base materials 41a to 41c are formed with a size corresponding to the size of the antenna patterns 42a to 42c, respectively, and the plurality of conductive films 11a to 11c, which are formed by providing the antenna patterns 42a to 42c on the film base materials 21a to 21c, respectively, are stacked in such a manner that the antenna patterns 42a to 42c match each other. In this example, three conductive films 11a to 11c are stacked, but the number of conductive films to be stacked is not limited to three.

At this time, a total thickness obtained when the number of stacked conductive films is multiplied by the thickness of the antenna pattern is set to a value calculated by Formula (1) as described later so that an impedance at a maximum load becomes equal to or less than 50Ω. The reason why a plurality of conductive films are stacked is that a desired thickness cannot be obtained in some cases if one conductive film is used when antenna patterns are formed by photolithography or the like, and that a desired thickness is ensured by stacking a plurality of conductive films.

When a plurality of conductive films is stacked, the conductive films need to be electrically connected to each other. This connection may be made using an external FPC connector, or may be made by forming a through-hole in the film base material and filling a conductive material in the through-hole.

The present disclosure will be described in more detail below by comparing Examples of the invention with Comparative Examples. However, the present disclosure is not limited to these Examples. The visibility was evaluated by changing, within a predetermined range, the length, interval, line width, and thickness of the antenna pattern 24 formed on the conductive film 21 as described above with reference to FIGS. 1A to 7.

The length of the antenna pattern 24 refers to the total length of a loop line (three to five turns, in general, in the example shown in FIG. 4) which is actually used among the loop lines 25a to 25e shown in FIG. 4. As the length increases, the impedance of the antenna pattern 24 as described later increases and the constraints on other parameters increase. In Examples of the invention and Comparative Examples, a case where the length of the antenna pattern 24 is 500 mm at which conditions for the impedance are most strict was studied, while the length of the antenna pattern 24 can be changed within a range from 200 to 500 mm.

The line width of the antenna pattern 24 refers to the width of each of the loop lines 25a to 25e shown in FIG. 4. When the line width of the antenna pattern 24 is large, the visibility deteriorates, while when the line width of the antenna pattern 24 is small, excellent visibility is obtained. A line width of 4 µm or more is required due to constraints on processing. Examples of the invention and Comparative Examples were compared and studied assuming that the line width of the antenna pattern 24 is in a range from 10 to 30 µm.

The thickness of the antenna pattern 24 refers to the thickness of each of the loop lines 25a to 25e of the antenna pattern 24 shown in FIG. 2. Basically, the thickness of the antenna pattern 24 does not affect the visibility. As the sectional area of the antenna pattern 24, i.e., the product of the line width and the thickness of the antenna pattern 24, decreases, the impedance of the antenna pattern 24 as described later increases.

While Examples of the invention and Comparative Examples were compared and studied assuming that the thickness of the antenna pattern 24 is in a range from 5 to 20 μm, the following Formula (1) was satisfied to determine the thickness of the antenna pattern 24.

Thickness=Specific Resistance×Length/(Impedance× Line Width) Formula (1)

The interval between the antenna patterns 24 refers to the interval between adjacent lines of the loop lines 25a to 25e shown in FIG. 4. If the interval between the antenna patterns 24 is small, the antenna patterns are dense in the width direction even when the line width of the antenna pattern 24 is small, which may lead to a deterioration in visibility. On the other hand, if the interval between the antenna patterns 24 is large, excellent visibility is obtained, but the antenna efficiency deteriorates. Examples of the invention and Comparative Examples were compared and studied assuming that the interval between the antenna patterns 24 is in a range from 100 to 700 μm.

A low resistive element is desirably used as the material of the antenna pattern 24. In the Examples of the invention, copper and silver were used. Both of silver and copper are low-resistance materials which enable narrow wiring by photolithography or the like. However, in terms of equipment cost and production cost, narrow wiring by screen printing or etching, which can be carried out at a lower cost, is optimal.

In the case of using copper, screen printing is employed, and it is generally difficult to produce the line width of several tens of μm, but narrow wiring can be achieved by etching. This facilitates the production of the antenna pattern 24 and makes it possible to design the antenna pattern 24 with excellent visibility.

The impedance of the antenna pattern 24 is determined depending on the specifications required by a customer. However, in many cases, the impedance of the antenna pattern 24 is 50Ω or less at a maximum load. Also in the Examples of the invention, the impedance of the antenna pattern 24 was 50Ω or less. The impedance of the antenna pattern 24 is calculated by the following Formula (A).

Impedance=Specific Resistance×(Length/Sectional Area) Formula (A)

In this case, the specific resistance of copper is represented by 1.67×10−8 Ωm, and the specific resistance of silver is represented by 1.59×10−8 Ωm. The length in the formula indicates the length of the antenna pattern 24 described above, and the sectional area in the formula indicates the sectional area of the antenna pattern 24 and is represented by the product of the line width and the thickness.

Based on the above concept, the impedance and visibility of the conductive film 21 in which the line width, length, thickness, and interval of the antenna pattern 24 were set to various values were evaluated. The evaluation results are shown in Table 1. In Examples and Comparative Examples shown in Table 1, copper was used as the material of the antenna pattern, but silver having a lower resistance may be used.

The visibility is evaluated to check whether the antenna pattern 24 can be visually observed in a state where the cover panel 22 is attached to the conductive film 11, and the evaluation is made by visual observation. A case where the visibility was excellent, i.e., the antenna pattern 24 does not come into view at all, was evaluated as "excellent"; a case where some of the antenna pattern 24 comes into view as compared with the "excellent" case was evaluated as "fair"; and a case where the antenna pattern 24 comes into view and disturbs the view was evaluated as "poor". As for the evaluation of the impedance, an impedance of less than 50Ω, which satisfies the specifications, was evaluated as "excellent", while an impedance of more than 50Ω was evaluated as "poor".

TABLE 1

| | Antenna pattern | | | | | Evaluation | |
|---|---|---|---|---|---|---|---|
| | Thickness (μm) | Length (mm) | Line width (μm) | Interval (μm) | Impedance (Ω) | Impedance | Visibility |
| Comparative example 1 | 5 | 500 | 10 | 200 | 172 | poor | excellent |
| Comparative example 2 | 10 | 500 | 10 | 200 | 86 | poor | excellent |
| Comparative example 3 | 15 | 500 | 10 | 200 | 57 | poor | excellent |
| Example 1 | 20 | 500 | 10 | 200 | 43 | excellent | excellent |
| Comparative example 4 | 5 | 500 | 20 | 200 | 86 | poor | excellent |
| Example 2 | 10 | 500 | 20 | 200 | 43 | excellent | excellent |
| Example 3 | 15 | 500 | 20 | 200 | 29 | excellent | excellent |
| Example 4 | 20 | 500 | 20 | 200 | 22 | excellent | excellent |
| Comparative example 5 | 5 | 500 | 25 | 200 | 69 | poor | fair |
| Comparative example 6 | 10 | 500 | 25 | 200 | 34 | excellent | fair |
| Comparative example 7 | 15 | 500 | 25 | 200 | 23 | excellent | fair |
| Comparative example 8 | 20 | 500 | 25 | 200 | 17 | excellent | fair |
| Comparative example 9 | 5 | 500 | 30 | 200 | 57 | poor | poor |
| Comparative example 10 | 10 | 500 | 30 | 200 | 29 | excellent | poor |

TABLE 1-continued

| | Antenna pattern | | | | | Evaluation | |
|---|---|---|---|---|---|---|---|
| | Thickness (μm) | Length (mm) | Line width (μm) | Interval (μm) | Impedance (Ω) | Impedance | Visibility |
| Comparative example 11 | 15 | 500 | 30 | 200 | 19 | excellent | poor |
| Comparative example 12 | 20 | 500 | 30 | 200 | 14 | excellent | poor |

Each of Comparative Examples 1 to 3 is an example in which the thickness of the antenna pattern having a length of 500 mm, a line width of 10 μm, and an interval of 200 μm was changed in a range from 5 to 15 μm. In these examples, the visibility was excellent. The impedance of the antenna pattern in Comparative Example 1 was 172Ω; the impedance of the antenna pattern in Comparative Example 2 was 86Ω; and the impedance of the antenna pattern in Comparative Example 3 was 57Ω. These impedances exceeded 50Ω.

Example 1 is an example in which the thickness of the antenna pattern 24 was 20 μm which was greater than that of Comparative Examples 1 to 3. In Example 1, the impedance of the antenna pattern 24 was 50Ω or less and the visibility was excellent.

Comparative Example 4 is an example in which the line width of the antenna pattern was 20 μm which was greater than that of Comparative Examples 1 to 3. In Comparative Example 4, the visibility was excellent. Meanwhile, the impedance of the antenna pattern exceeded 50Ω.

In Examples 2 to 4, the line width of the antenna pattern 24 was 20 μm. The thickness of the antenna pattern 24 in Example 2 was 10 μm; the thickness of the antenna pattern 24 in Example 3 was 15 μm; and the thickness of the antenna pattern 24 in Example 4 was 20 μm. In Examples 2 to 4, the impedance of the antenna pattern 24 was 50Ω or less and the visibility was excellent.

In Comparative Examples 5 to 8, the line width of each antenna pattern was 25 μm. The thickness of the antenna pattern in Comparative Example 5 was 5 μm; the thickness of the antenna pattern in Comparative Example 6 was 10 μm; the thickness of the antenna pattern in Comparative Example 7 was 15 μm; and the thickness of the antenna pattern in Comparative Example 8 was 20 μm. Only in Comparative Example 5, the impedance of the antenna pattern exceeded 50Ω, and in the other Comparative Examples, the impedance of the antenna pattern was 50Ω or less. However, it cannot be said that, in any of Comparative Examples 5 to 8, the visibility of the antenna pattern was excellent, i.e., the antenna pattern did not come into view at all, and thus the evaluation result was average. When Examples 2 to 4 are compared with Comparative Examples 5 to 8, it is considered that an upper limit of the line width of the antenna pattern with excellent visibility is 20 μm.

In Comparative Examples 9 to 12, the line width of the antenna pattern was 30 μm. The thickness of the antenna pattern in Comparative Example 9 was 5 μm; the thickness of the antenna pattern in Comparative Example 10 was 10 μm; the thickness of the antenna pattern in Comparative Example 11 was 15 μm; and the thickness of the antenna pattern in Comparative Example 12 was 20 μm. Only in Comparative Example 9, the impedance of the antenna pattern exceeded 50Ω, and in the other Comparative Examples, the impedance of the antenna pattern was 50Ω or less. However, in any of Comparative Examples 9 to 12, the visibility of the antenna pattern was poor. This is because, as described above, the line width in each of Comparative Examples 9 to 12 exceeded the upper limit 20 μm of the line width of the antenna pattern with excellent visibility.

Next, effects on the visibility when the interval between the antenna patterns was changed were evaluated. It is generally known that, as the interval between the antenna patterns is increased, the visibility is improved, but if the interval between the antenna patterns is extremely large, the power efficiency deteriorates. Accordingly, the power efficiency was also evaluated. The results are shown in Table 2.

TABLE 2

| | Antenna pattern | Evaluation | |
|---|---|---|---|
| | Interval (μm) | Visibility | Power efficiency |
| Comparative example 13 | 100 | fair | excellent |
| Example 2 | 200 | excellent | excellent |
| Example 2-1 | 300 | excellent | excellent |
| Example 2-2 | 400 | excellent | excellent |
| Example 2-3 | 500 | excellent | fair |
| Example 2-4 | 600 | excellent | fair |
| Comparative example 14 | 700 | excellent | fair |

Table 2 shows results obtained by changing only the interval between the antenna patterns of Example 2 in Table 1 in a range from 100 to 700 μm. A case where the power efficiency was excellent was evaluated as "excellent", and a case where the power efficiency was slightly lower was evaluated as "fair". Note that the impedance of the antenna pattern is determined depending on the length, line width, thickness, and specific resistance. In each of Examples 2-1 to 2-4 and Comparative Examples 13 and 14, the impedance was 50Ω or less.

Comparative Example 13 is an example in which the interval between the antenna patterns was narrowed to 100 μm in comparison with Example 2. In Comparative Example 13, the visibility of the antenna pattern was not excellent and was slightly lower than that when the interval between the antenna patterns was 200 to 400 μm.

Example 2 is an example in which the interval of the antenna pattern 24 was 200 μm as shown in Table 1, and the visibility and power efficiency were excellent.

Each of Examples 2-1 to 2-4 is an example in which the interval between the antenna patterns 24 was changed from that of Example 2. In Examples 2-1 to 2-4 the intervals are 300 μm, 400 μm, 500 μm, and 600 μm, respectively. Also in Examples 2-1 to 2-4, the visibility and power efficiency of the antenna pattern 24 were excellent.

Comparative Example 14 is an example in which the interval between the antenna patterns was changed to 700 μm from that of Example 2. In Comparative Example 14, the visibility of the antenna patterns was excellent, but the power efficiency was slightly lower than that when the interval between the antenna patterns was 200 to 400 μm.

As apparent from the above results, the length of the antenna pattern is desirably set in a range from 200 to 500 mm, the interval between the antenna patterns is desirably set in a range from 200 to 400 μm, and the line width is desirably set in a range from 4 to 20 μm so as to satisfy the conditions that the impedance of the antenna pattern 24 is excellent and the impedance of the antenna pattern at the maximum load is 50Ω or less. Further, the thickness of the antenna pattern is obtained based on Formula (A).

As described above, the conductive film 11 according to this embodiment includes the film base material 21 and the antenna pattern 24 for near field communication formed of a metal having excellent conductivity on one surface of the film base material 21. In the conductive film 11 in which the both ends of the antenna pattern 24 are located at an edge of the film base material 21 and the antenna pattern 24 is formed as a plurality of linear loops surrounding the vacant area 24a in such a manner that the vacant area 24a is located at the center of the antenna pattern 24, the antenna pattern 24 is formed of a metal having excellent conductivity; the antenna pattern 24 has a length of 200 to 500 mm, an interval between adjacent lines of the loop lines 25a to 25e of 200 to 400 μm, and a line width of 4 to 20 μm; and the thickness of the antenna pattern 24 is set to a value calculated by the following Formula (1) so that the impedance at the maximum load becomes equal to or less than 50Ω:

Thickness=Specific Resistance×Length/(Impedance×Width)  Formula (1)

With this configuration, the antenna pattern 24 is formed of a metal having excellent conductivity and the thickness of the antenna pattern 24 is set so that the impedance becomes equal to or less than 50Ω. Further, the antenna pattern 24 is formed into a loop line with three to five turns, a length of 200 to 500 mm, an interval between adjacent loop lines of 200 to 400 μm, and a line width of 4 to 20 μm. Accordingly, the visibility can be improved while the impedance of the antenna pattern 24 formed on the conductive film 21 is suppressed.

Further, the film base material 21 is formed with a size corresponding to the size of the antenna pattern 24, and the plurality of conductive films 11a to 11c formed by providing the antenna patterns 42a to 42c on the film base materials 41a to 41c, respectively, are stacked in such a manner that the antenna patterns 42a to 42c match each other. In addition, the thickness obtained when the number of stacked conductive films is multiplied by the thickness of the antenna pattern may be set to a value at which the impedance at the maximum load is 50Ω or less. With this configuration, the degree of freedom in setting the thickness of the antenna patterns of the film base materials 41a to 41c can be improved.

Like in the antenna patterns 50, 51, and 52, each of the loop lines 25a to 25e may be formed into one of a square, a triangle, and a circle. With this configuration, an antenna pattern that matches the shape of a tag can be selected.

The conductive film 80 which is formed by stacking two conductive films may have a configuration in which the antenna pattern 75 is formed on one of the conductive films, i.e., the conductive film 73, and a plurality of antennas may be formed on the other one of the conductive films, i.e., the conductive film 72. With this configuration, the degree of freedom in producing the conductive film 21 can be improved.

The touch panel 10 may be configured in such a manner that the electrode pattern 23 for detecting a touch position in the X-direction and a touch position in the Y-direction is formed on the other surface of the conductive film 11, and the cover panel 22 is superimposed on the other surface of the conductive film 11. With this configuration, the conductive film 11 can be formed into a film with a simple structure and the production process thereof can be simplified, which leads to a reduction in production cost.

In the touch panel 10, the conductive film 80 further includes another conductive film 72 and the conductive film 73, and has a configuration in which a pair of electrode patterns 74 for detecting a touch position in the X-direction and a touch position in the Y-direction are formed in a divided manner on both sides of the other conductive film 72; the other conductive film 72 is superimposed on a surface of the conductive film 72 opposite to a surface on which the antenna pattern 75 is formed; and the cover panel 71 is superimposed on the other conductive film 72.

With this configuration, the pair of electrode patterns 74 can be formed in a divided manner on both sides of the conductive film. Consequently, each electrode pattern can be formed with a simple configuration as compared with a case where the electrode patterns are formed on one surface of the conductive film.

Note that the technical scope of the conductive film and the touch panel according to the present disclosure is not limited to the embodiments described above, but includes various modifications of the components set forth in the claims.

As described above, the conductive film and the touch panel according to the present disclosure have an advantageous effect the visibility can be improved while the impedance of the antenna pattern formed on the conductive film is suppressed. Therefore, the conductive film and the touch panel according to the present disclosure are useful for a wide variety of conductive films.

What is claimed is:

1. A plurality of conductive films each comprising:
a transparent first film base material; and
an antenna pattern for near field communication formed of a metal having excellent conductivity on one surface of the transparent first film base material, the antenna pattern having a first end and a second end located at an edge of the transparent first film base material, the antenna pattern being formed as a plurality of linear loops surrounding a vacant area on the transparent first film base material so that the vacant area is located at a center of the antenna pattern, wherein
a total length of the plurality of linear loops of the antenna pattern is 200 to 500 mm, a spacing between adjacent ones of the plurality of linear loops is 200 to 400 ; μm, and a line width of the plurality of linear loops is 4 to 20 μm,
the plurality of conductive films are stacked in such a manner that the antenna patterns together form a vertically-stacked antenna with each respective antenna pattern vertically matching each other,
a thickness of each antenna pattern is such that an impedance of the vertically-stacked antenna at a maximum load is equal to or less than 50 Q, and
the vertically-stacked antenna is configured opposite an electrode pattern formed on another conductive film for detecting a touch position, the electrode pattern comprising a first electrode pattern for detecting an X-direction of the touch position formed on a first side of the another conductive film, and a second electrode pattern for detecting a Y-direction of the touch position formed on a second side of the another conductive film.

2. The conductive film according to claim 1, wherein each loop line of the plurality of linear loops of the antenna pattern is formed into one of a square, a triangle, and a circle.

3. A touch panel comprising a conductive film according to claim 1, wherein
a cover panel is superimposed on one of the first and second sides of the another conductive film.

4. A touch panel comprising a conductive film according to claim 1, further comprising
the another conductive film is superimposed opposite to a surface on which a closest antenna pattern is formed, and
a cover panel is further superimposed on the another conductive film.

* * * * *